United States Patent
Chen

(10) Patent No.: US 6,598,977 B1
(45) Date of Patent: Jul. 29, 2003

(54) COLOR WHEEL HAVING A BONDING APPARATUS

(75) Inventor: Jason Chen, Taichung (TW)

(73) Assignee: Progressive Optoelectronics Technology Co., Ltd., Taichung (TW)

( * ) Notice: Subject to any disclaimer, the term of this patent is extended or adjusted under 35 U.S.C. 154(b) by 0 days.

(21) Appl. No.: 10/214,150

(22) Filed: Aug. 8, 2002

(51) Int. Cl.$^7$ .............................. G02B 5/22; G03B 21/14
(52) U.S. Cl. .......................... 353/31; 359/891; 359/892; 348/743; 348/835
(58) Field of Search .............................. 353/31; 348/742, 348/743, 835; 359/578, 580, 889, 891, 892

(56) References Cited

U.S. PATENT DOCUMENTS

| | | | | |
|---|---|---|---|---|
| 5,868,482 A | * | 2/1999 | Edlinger et al. ............... 353/84 |
| 5,980,076 A | * | 11/1999 | Dunn et al. ................. 362/562 |
| 6,011,662 A | * | 1/2000 | Evans ........................ 359/891 |
| 6,024,453 A | * | 2/2000 | Edlinger et al. .............. 353/84 |
| 6,504,598 B2 | * | 1/2003 | Kitano ........................ 355/71 |
| 2002/0003704 A1 | * | 1/2002 | Ohmae et al. ............... 362/293 |

* cited by examiner

*Primary Examiner*—Russell Adams
*Assistant Examiner*—Michael Dalakis
(74) *Attorney, Agent, or Firm*—Birch, Stewart, Kolasch & Birch, LLP

(57) ABSTRACT

A color wheel having a bonding apparatus consists of a carrier and a filter set. The carrier is a circular disk and has a first surface and a second surface opposite to each other. The first surface has a bulged rim formed thereon. The carrier has a plurality of apertures formed thereon between the bulged rim and the perimeter thereof. The filter set is mounted onto the first surface of the carrier. Adhesive is injected and filled into the apertures from the second surface such that the filter set is bonded to the first surface of the carrier to form the color wheel of the invention. The color wheel thus made has evenly coated adhesive without increasing the thickness thereof.

7 Claims, 8 Drawing Sheets

COLOR WHEEL HAVING A BONDING APPARATUS

FIELD OF THE INVENTION

The present invention relates to an optical element for projection equipment and particularly a color wheel for filtering use in the projection equipment.

BACKGROUND OF THE INVENTION

The commonly used projection equipment project light from a high luminous lamp. The light passes through a color wheel consisting of filters to attain a full color effect, then is projected to form an image through a lens. Color quality of the projecting image is an issue all producers have been pursuing.

The design of the color wheel directly affects the color quality of the projecting image. Refer to FIG. 1 for a conventional color wheel. It includes a circular disk carrier 1 with a bulged rim 2 and a filter set 3 with a center opening. The circular disk carrier 1 has a surface 4 coated with a layer of adhesive, then the filter set 3 is bonded to the surface 4 of the carrier 1 through coupling the center opening of the filter set 3 on the bulged rim 2 to form the color wheel. The color wheel thus formed is tested for balance to ensure reaching the required quality. However, when the adhesive is coated on the surface 4 of the carrier 1 that has the bulged rim 2 formed thereon, it is difficult to get an evenly coating, and the thickness of the coating adhesive has variations. The thickness of the color wheel also increases. As a result, the color wheel cannot attain a balanced rotation. Other means have to be adopted to improve such a situation, such as to increase or decrease the substance of the color wheel. When the improvement fails, the color wheel has to be discarded.

There are other types of color wheels. FIG. 2 shows an example disclosed in Taiwan patent No. 90212025 which is constructed to prevent spilling of the adhesive. It includes a carrier element 5 and a filter set 6. The carrier element 5 has a bonding zone with at least one annular groove 7 formed thereon. During dispensing the adhesive on the carrier element, excessive adhesive flows into the annular groove 7. While it overcomes the adhesive spilling problem, the problem of uneven adhesive coating remains unresolved.

As the conventional methods mentioned above dispense adhesive on a large area on the surface of the carrier, they are prone to create the problem of uneven coating. This problem remains to be overcome.

SUMMARY OF THE INVENTION

Therefore the primary object of the invention is to resolve the problem of uneven coating of adhesive that occurs to conventional color wheels. The invention provides a design of the color wheel that has apertures for evenly dispensing and distributing the adhesive without increasing the thickness of the color wheel.

In order to achieve the object set forth above, the color wheel having a bonding apparatus according to the invention includes a carrier and a filter set. The carrier is a circular disk and has a first surface and a second surface. The first surface has a bulged rim. A plurality of apertures are formed on the carrier between the bulged rim and the perimeter of the carrier. The filter set is mounted onto the first surface of the carrier. Adhesive is injected and filled into the apertures from the second surface such that the filter set is bonded to the first surface of the carrier to form the color wheel. By means of such a design, the adhesive may be evenly dispensed and coated without increasing the thickness of the color wheel.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
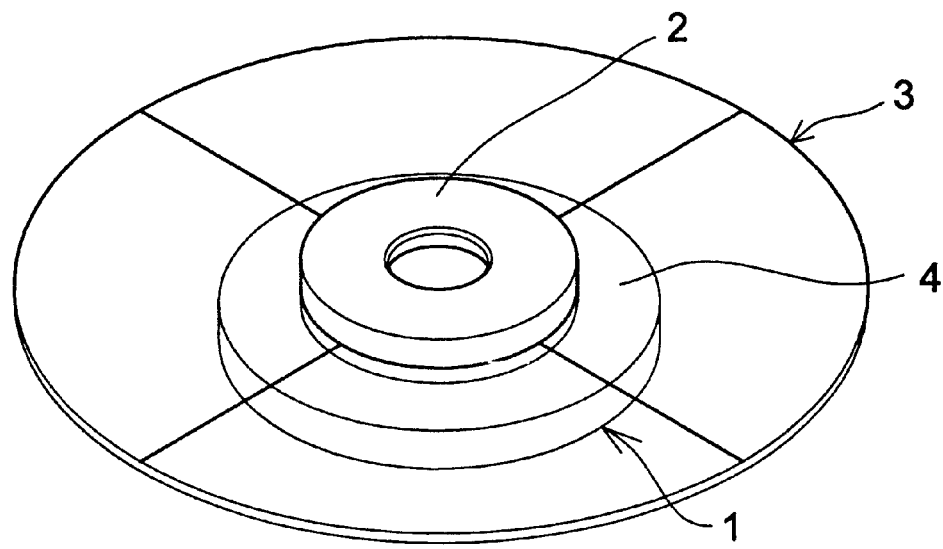
FIG. 1 is a perspective view of a conventional color wheel.
Figure 2:
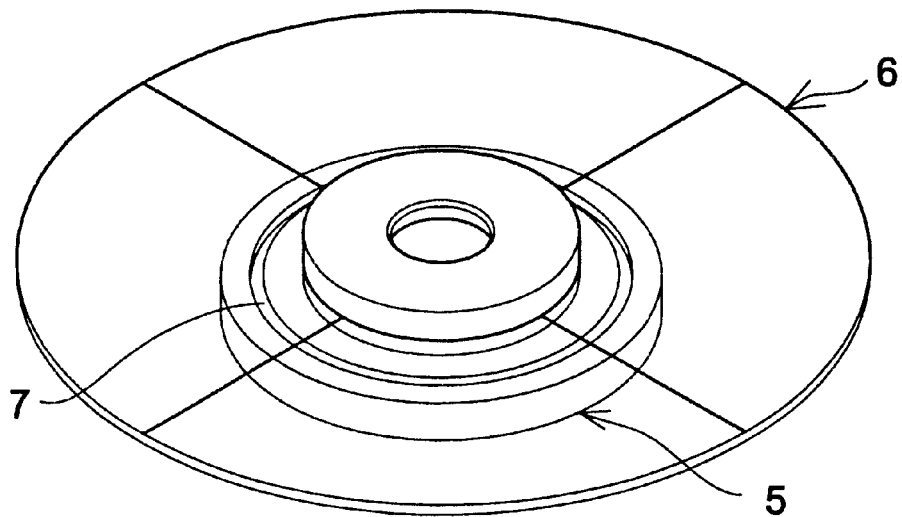
FIG. 2 is a perspective view of another conventional color wheel.
Figure 3:
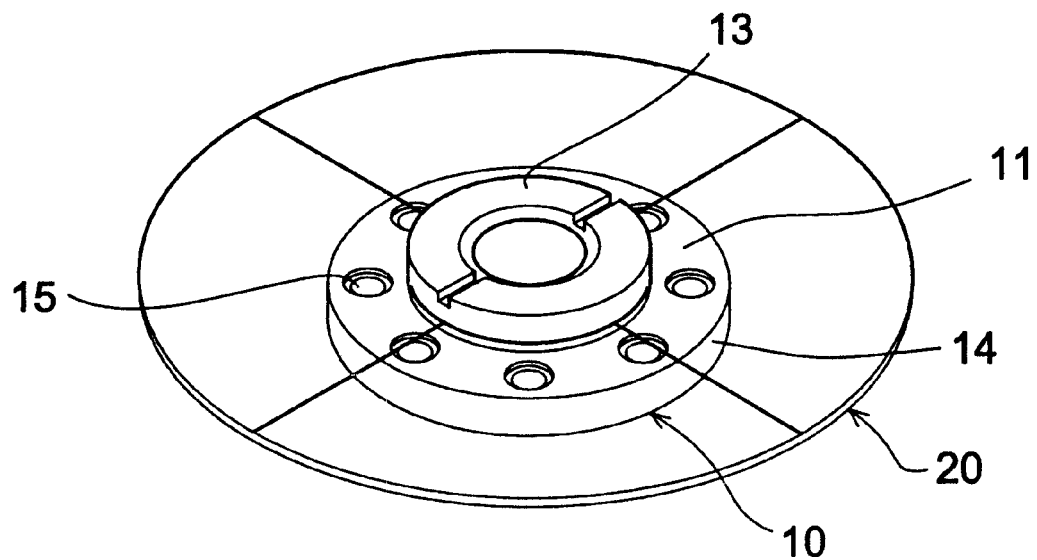
FIG. 3 is a perspective view of a first embodiment of the color wheel of the invention.
Figure 5:
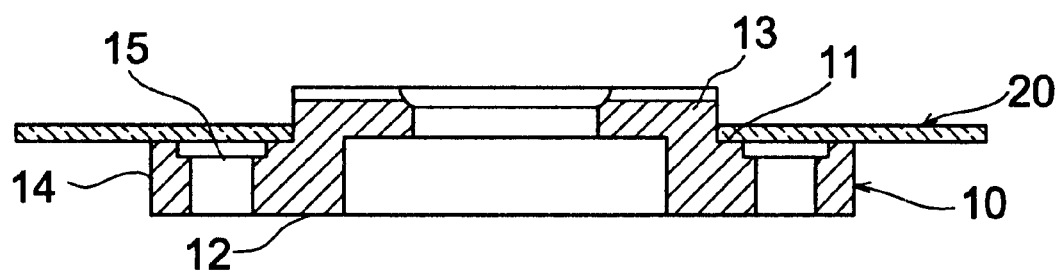
FIG. 5 is a cross section of the first embodiment of the color wheel of the invention.
Figure 4:
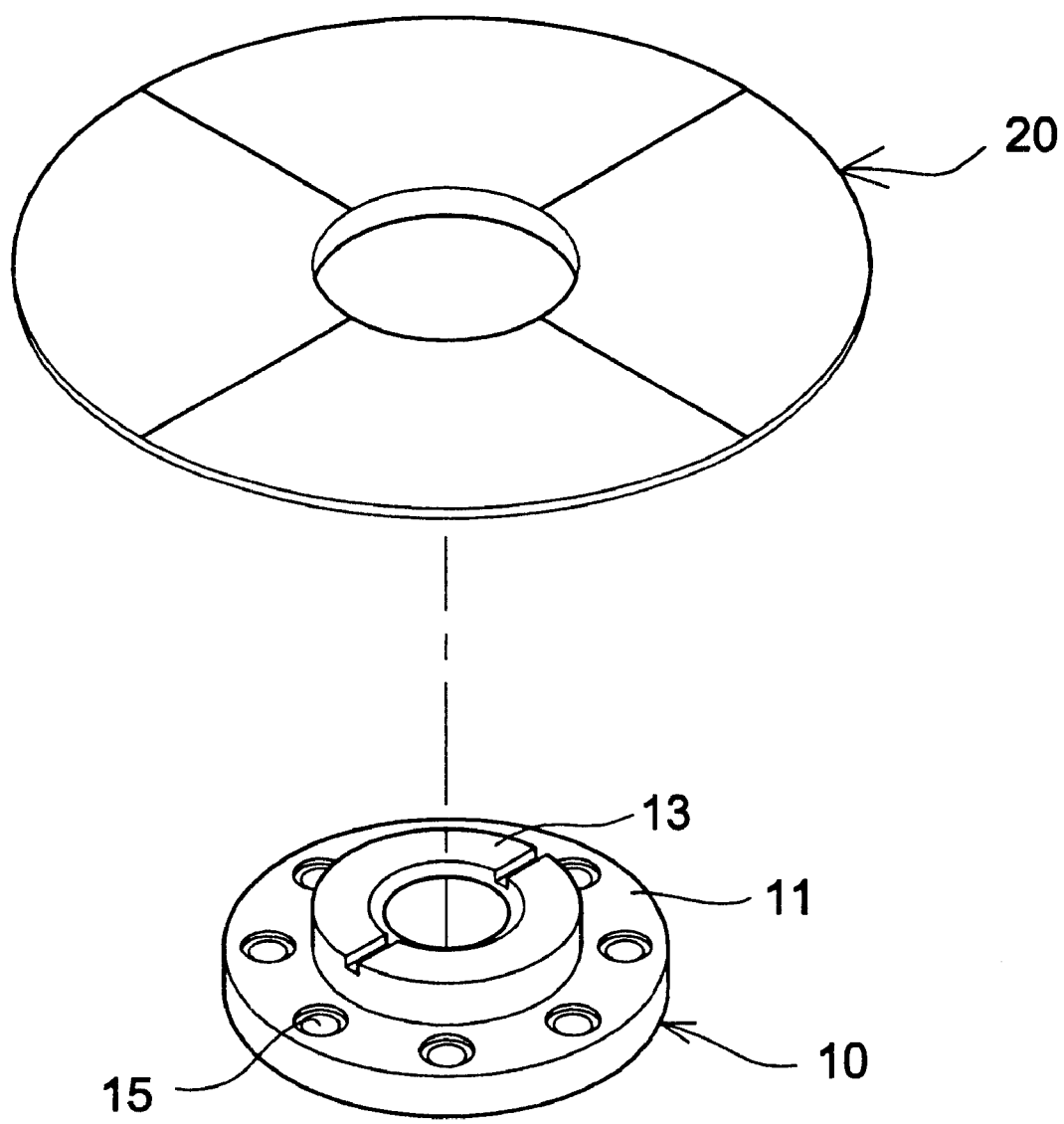
FIG. 4 is an exploded view of the first embodiment of the color wheel of the invention.
Figure 6:
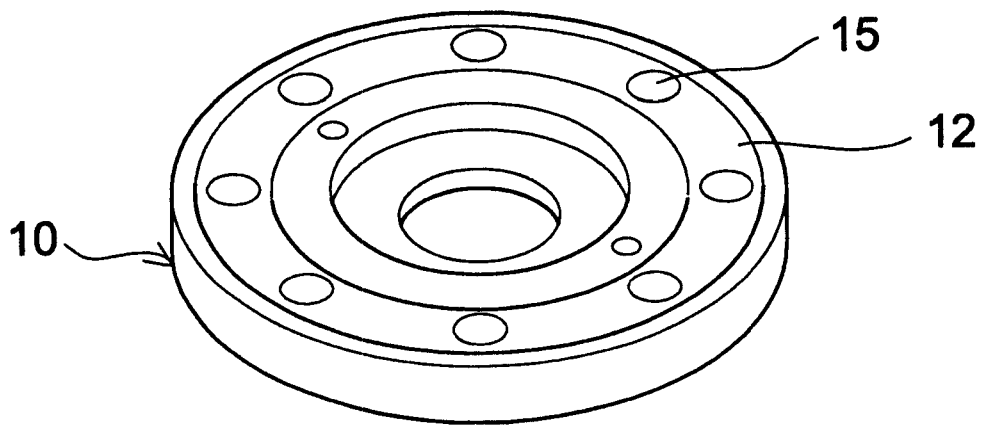
FIG. 6 is another perspective view of the first embodiment of the color wheel of the invention.
Figure 7:
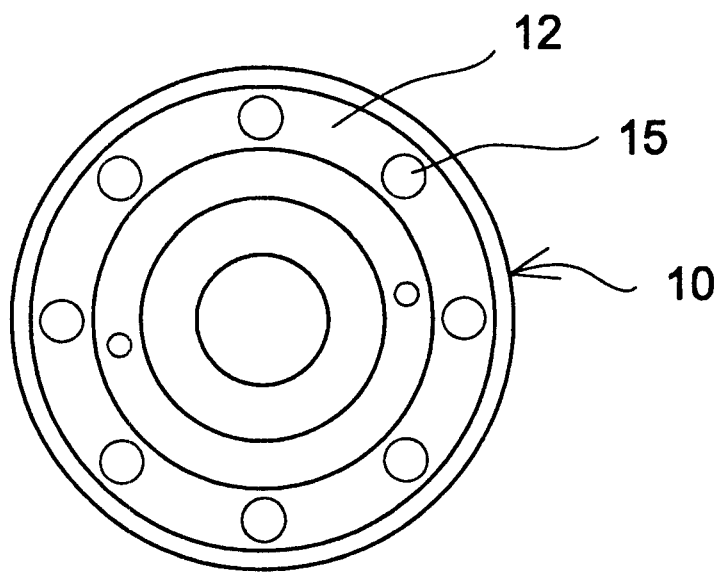
FIG. 7 is a top view of the invention according to FIG. 6.
Figure 8:
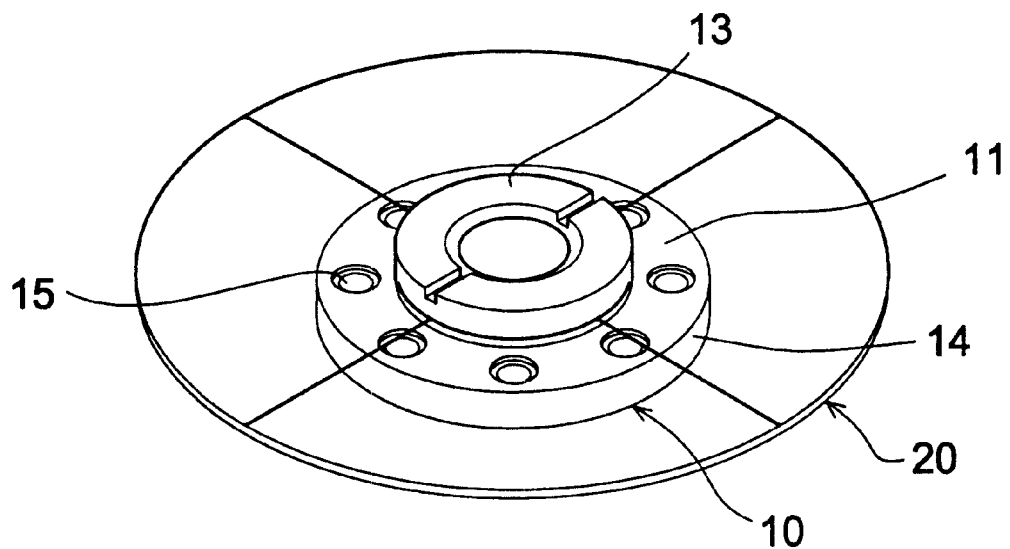
FIG. 8 is a perspective view of a second embodiment of the color wheel of the invention.
Figure 9:
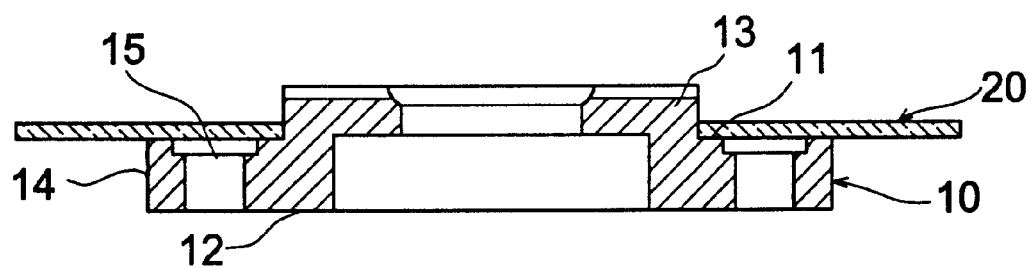
FIG. 9 is a cross section of the second embodiment of the color wheel of the invention.
Figure 10:
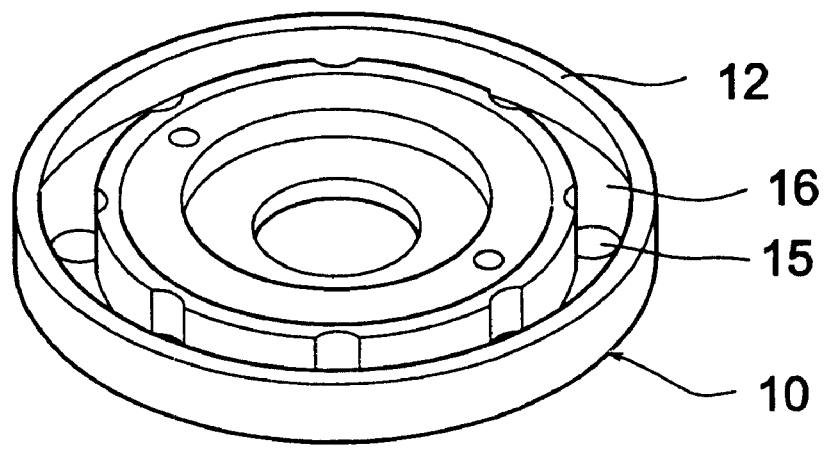
FIG. 10 is a perspective view of the second embodiment of the color wheel of the invention, including a groove.
Figure 11:
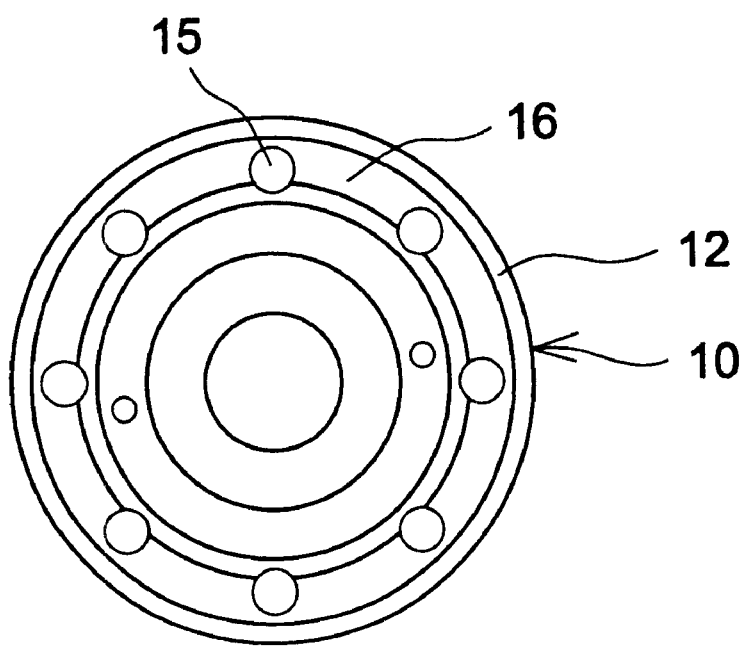
FIG. 11 is a top view of the invention according to FIG. 10.
Figure 12:
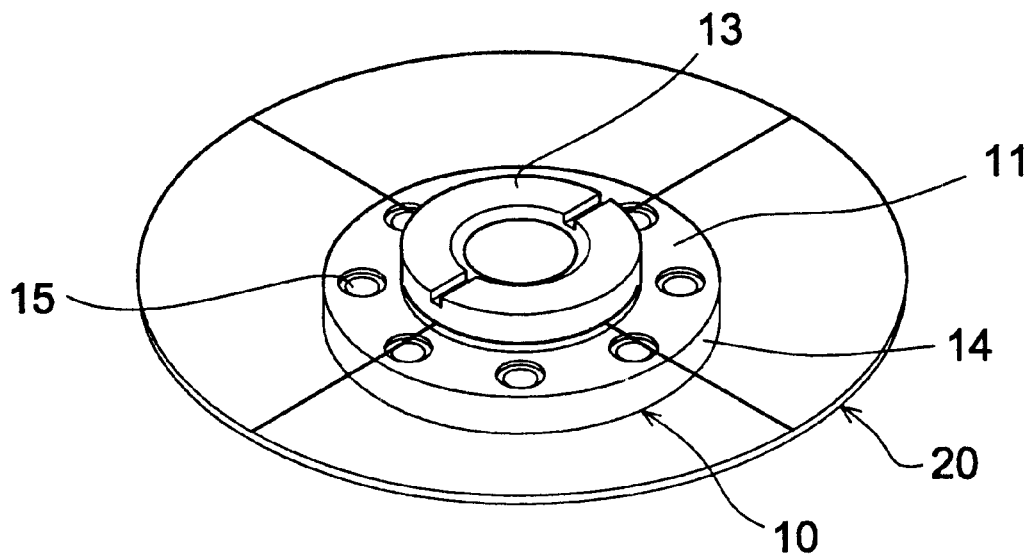
FIG. 12 is a perspective view of a third embodiment of the color wheel of the invention.
Figure 13:
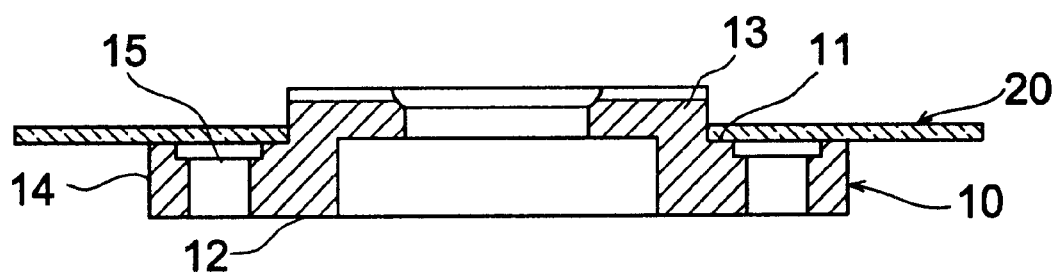
FIG. 13 is a cross section of the third embodiment of the color wheel of the invention.
Figure 14:
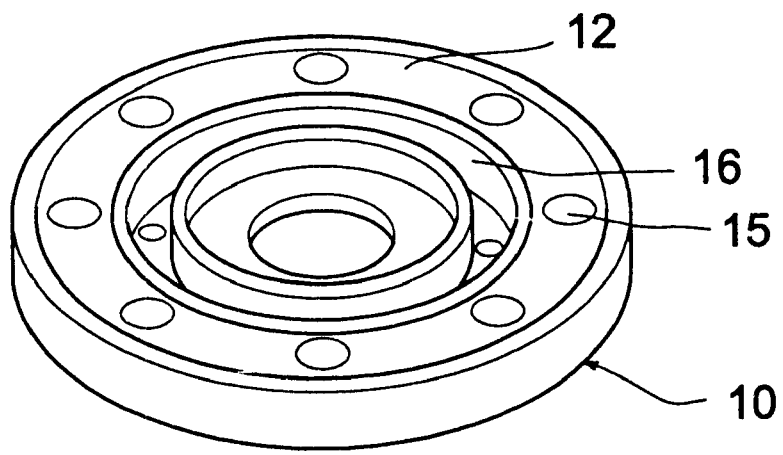
FIG. 14 is a perspective view of the third embodiment of the color wheel of the invention, including a groove.
Figure 15:
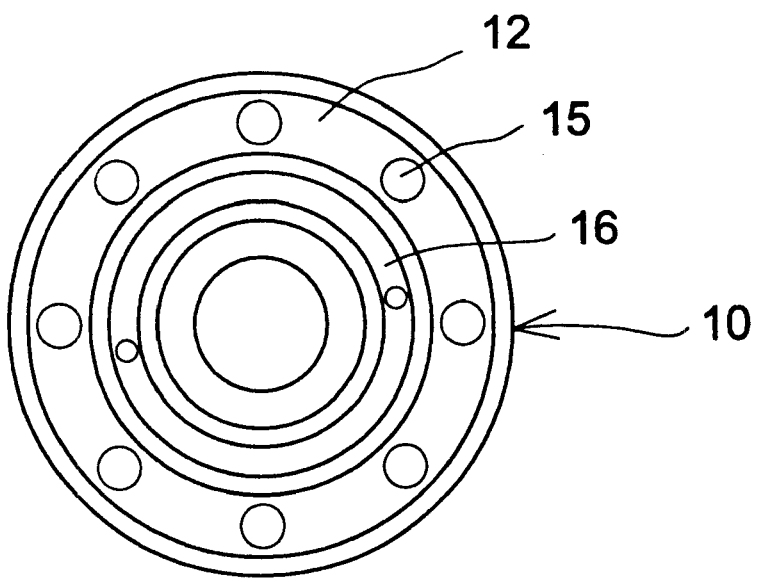
FIG. 15 is a top view of the invention according to FIG. 14.

Referring to FIGS. 3, 4 and 5, the color wheel of the invention includes a carrier 10 and a filter set 20. The carrier 10 is a circular disk and has a first surface 11 and a second surface 12 opposite to each other. The first surface 11 has a bulged rim 13 formed thereon. The carrier 10 has a plurality of apertures 15 formed thereon between the bulged rim 13 and the perimeter 14 thereof. The apertures 15 run through the first surface 11 and the second surface 12, and are formed in a stepwise manner with a larger diameter on the first surface 11 and a smaller diameter on the second surface 12. The filter set 20 is mounted onto the first surface 11 of the carrier 10. Adhesive is injected and filled into the apertures 15 from the second surface 12 such that the filter set 20 is bonded to the first surface 11 of the carrier 10 to form the color wheel of the invention.

The following describes preferred embodiments of the invention.

First Embodiment

Referring to FIGS. 3, 5, 6 and 7, the color wheel having a bonding apparatus according to the invention includes a carrier 10 and a filter set 20. The carrier 10 is a circular disk and has a first surface 11 and a second surface 12 opposite to each other. The first surface 11 has a bulged rim 13 formed thereon. The carrier 10 has a plurality of apertures 15 formed thereon between the bulged rim 13 and the perimeter 14 thereof in an annular and equally spaced manner. The apertures 15 run through the first surface 11 and the second surface 12, and are formed in a stepwise manner with a larger diameter on the first surface 11 and a smaller diameter on the second surface 12. The filter set 20 is mounted onto the first surface 11 of the carrier 10. Adhesive is injected and filled into the apertures 15 from the second surface 12 such that the filter set 20 is bonded to the first surface 11 of the carrier 10 to form the color wheel of the invention. After the color wheel is assembled, it may be engaged with a motor (not shown in the drawings) and be driven for rotation.

As the apertures 15 are filled with adhesive, the apertures 15 on the first surface 11 form a bonding area for the filter set 20. In addition, the apertures 15 are formed in a stepwise shape with a larger area on the first surface 11 and a smaller area on the second surface 12, the bonding area between the filter set 20 and the first surface 11 increases. Moreover, the adhesive is filled in the apertures 15, comparing with the conventional techniques of dispensing and coating the adhesive on the entire surface, the first surface 11 does not have the problems of uneven coating or thickness variations of the adhesive. Furthermore, selection of the adhesive may be determined based on considerations of the rotation speed of the color wheel, the weight of the color wheel and number of the apertures so that the carrier 10 and the filter set 20 may obtain a desired bonding.

Second Embodiment

Referring to FIGS. 8 through 11, this embodiment is largely constructed like the first embodiment set forth above, and same or equivalent elements are marked by the same numerals. The difference between this embodiment and the first embodiment is that the second surface 12 of the carrier 10 has at least one annular groove 16 formed thereon to communicate with the apertures 15. The groove 16 may be filled with desired materials to reach rotation balance the color wheel.

Third Embodiment

Referring to FIGS. 12 through 15, this embodiment is largely constructed like the first embodiment set forth above, and same or equivalent elements are marked by the same numerals. The difference between this embodiment and the first embodiment is that the second surface 12 of the carrier 10 has at least one annular groove 16 formed thereon, and the groove 16 does not communicate with the apertures 15. The groove 16 may be filled with desired materials to reach rotation balance the color wheel.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A color wheel having a bonding apparatus, comprising:

a carrier formed in a circular disk having a first surface and a second surface opposite to each other, the first surface having a bulged rim formed thereon, the carrier having a plurality of apertures formed thereon between the bulged rim and the perimeter thereof; and a filter set mounted onto the first surface of the carrier;

wherein the apertures are filled with adhesive for bonding the filter set to the first surface of the carrier.

2. The color wheel of claim 1, wherein the apertures are formed in a stepwise manner with a larger diameter on the first surface and a smaller diameter on the second surface.

3. The color wheel of claim 1, wherein the apertures are arranged in an annular fashion and in an equally spaced manner between the bulged rim and the perimeter of the carrier.

4. The color wheel of claim 1, wherein the adhesive is injected and filled into the apertures from the second surface.

5. The color wheel of claim 1, wherein the second surface has at least one groove formed thereon.

6. The color wheel of claim 5, wherein the groove is annular.

7. The color wheel of claim 5, wherein the groove communicates with apertures.

* * * * *